Nov. 25, 1924.
W. A. KING
1,516,740
METHOD OF MAKING BEARINGS
Filed April 1, 1922 2 Sheets-Sheet 1
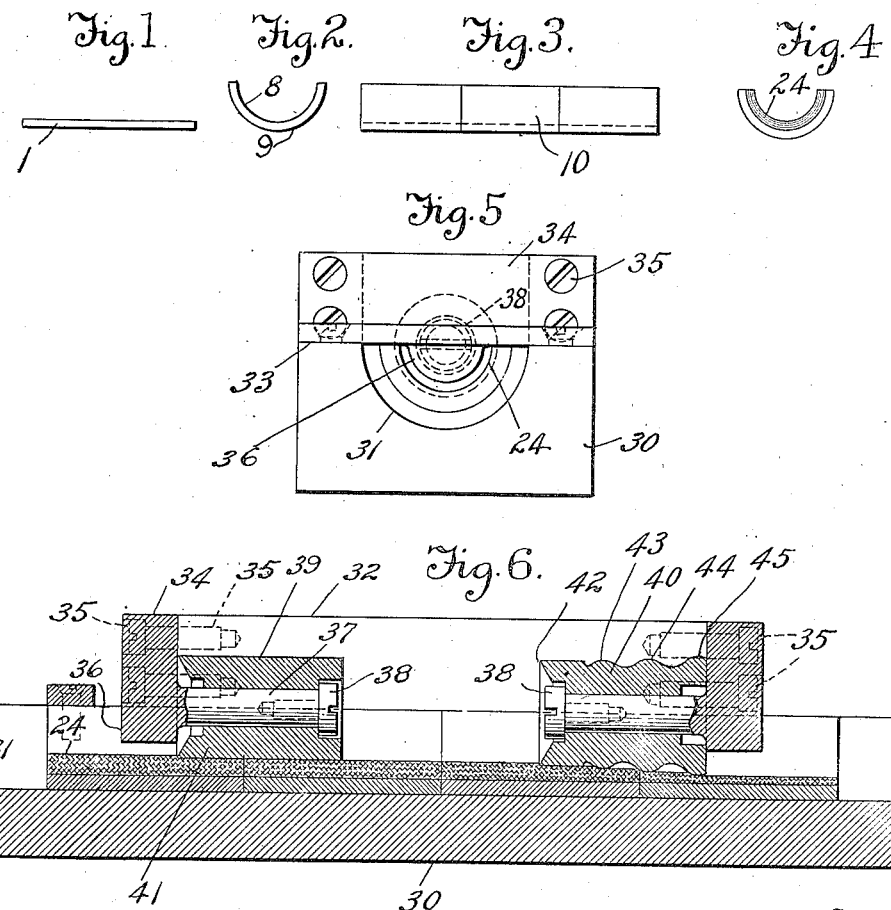
Inventor
Walter A. King
By
Attorneys

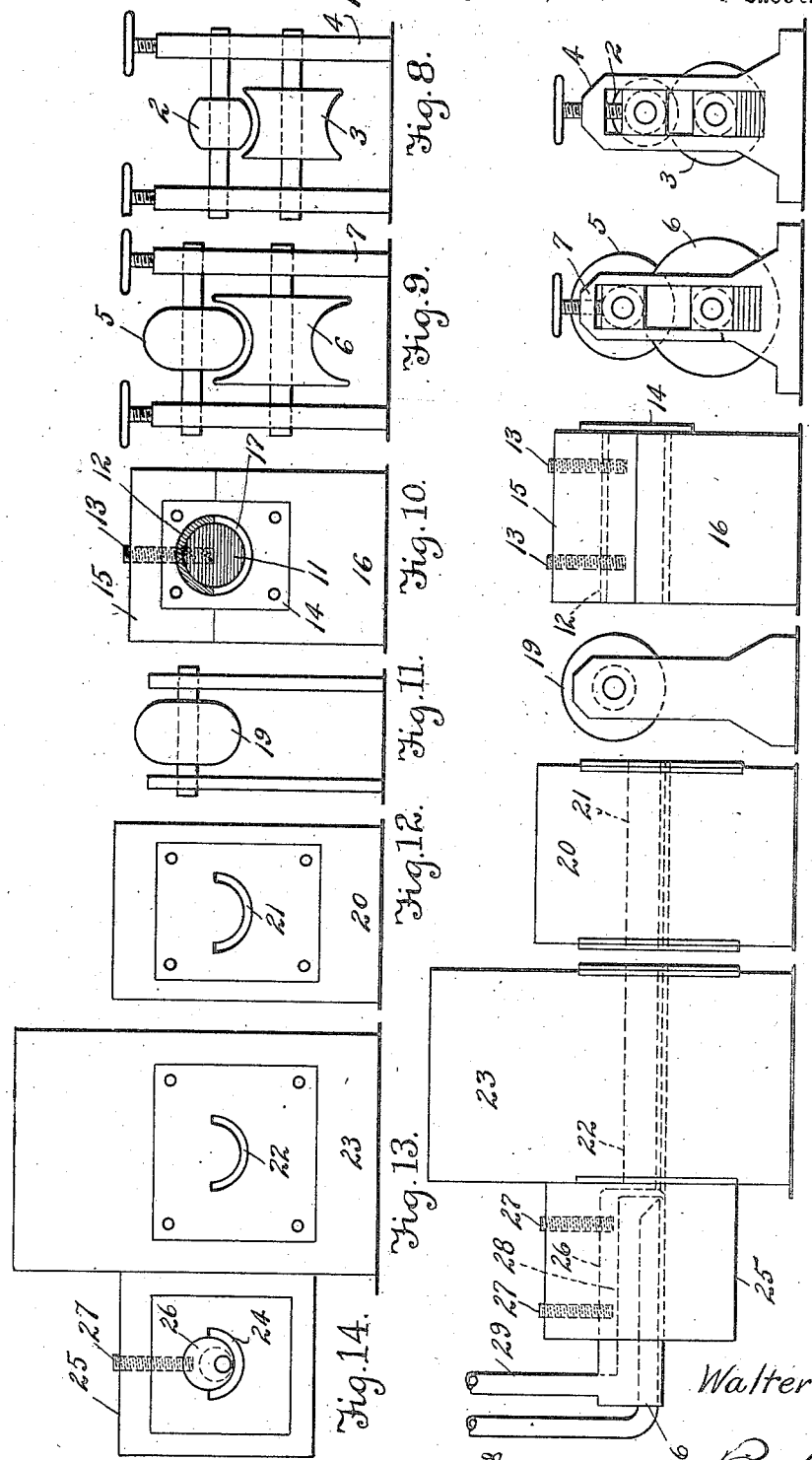

Patented Nov. 25, 1924.

1,516,740

UNITED STATES PATENT OFFICE.

WALTER A. KING, OF FERNDALE, MICHIGAN, ASSIGNOR OF ONE-HALF TO FREDERICK E. DAVIES, OF FERNDALE, MICHIGAN.

METHOD OF MAKING BEARINGS.

Application filed April 1, 1922. Serial No. 548,728.

*To all whom it may concern:*

Be it known that I, WALTER A. KING, a citizen of the United States of America, residing at Ferndale, in the county of Oakland and State of Michigan, have invented certain new and useful Improvements in Methods of Making Bearings, of which the following is a specification, reference being had therein to the accompanying drawings.

This invention relates to a method of producing bearings, bushings and the like and my invention aims to expeditiously and economically produce bearings on a large scale with minimum labor and apparatus, the bearings being perfect as to size and fabrication, so that the bearings may be interchangeable and possess characteristics adapting the bearings for general use.

My invention and advantages gained thereby will be hereinafter more fully described and then claimed, and reference will now be had to the drawings, wherein—

Figure 1 is an end view of a piece of flat stock that may be rolled, pressed or otherwise shaped to form a semi-cylindrical member constituting the body of a bearing part;

Fig. 2 is a similar view of the piece of stock after having a semi-cylindrical shape imparted thereto;

Fig. 3 is a side elevation of the same showing how the piece of stock, in strip form, is sawed, severed or otherwise divided to provide bearing parts of desired length;

Fig. 4 is an end view of a bearing part or body provided with a liner of Babbitt or other soft metal;

Fig. 5 is an end view of a roughing, finishing and burnishing apparatus by which final steps of my method are carried into effect;

Fig. 6 is a longitudinal sectional view of the same showing bearing parts being operated upon by the apparatus;

Fig. 7 is a side elevation of the line-up of a plurality of devices constituting an apparatus by which steps of my method may be put into practice;

Fig. 8 is an end view of preliminary forming rolls for a flat piece of stock;

Fig. 9 is a similar view of final forming rolls which impart a semi-cylindrical shape to a piece of stock that has been partially formed by the rolls shown in Fig. 8;

Fig. 10 is an end view of a trimming device employed for trimming edges relative to the center line and outer radius of a semi-cylindrical bearing body or member;

Fig. 11 is an end view of an acid applying or swabbing device by which the inner wall of a bearing body or member may be prepared for tinning;

Fig. 12 is an end view of a tinning device, through which a bearing body or member is moved and prepared to receive babbitt or a similar metal;

Fig. 13 is an end view of a Babbitt tank or babbitting device by which a lining of babbitt may be applied to the inner wall of the bearing body or member; and Fig. 14 is an end view of a cooling device by which a babbitted bearing body or member may be cooled and chilled.

In order that my method may be understood, I endeavor to show, somewhat diagrammatically, the line-up of various devices by which the various operations or steps of my method may be carried into effect, but I desire it to be understood that the various steps or operations involved in my method may be performed in connection with apparatus, other than that shown, especially the production of babbitted bearing members or parts that may be operated upon to provide finished articles.

Considering the production of such an unfinished article, reference will first be had to Figs. 7 to 14 inclusive showing the apparatus for operating upon a metallic blank or a flat piece of stock which is brought to proper shape and form, as shown in Figs. 1 to 4 inclusive.

First, I select a comparatively clean strip of metal 1 and feed it between preliminary forming rolls 2 and 3 supported by suitable housings 4 and driven from a suitable source of energy. The preliminary forming rolls 2 and 3 impart a trough shape to the flat piece of metal 1 and from these preliminary forming rolls the partially formed strip passes between final shaping rolls 5 and 6, arranged in housings 7 and adapted to be driven from a suitable source of energy. These final shaping rolls impart a cylindrical shape to the strip of metal and form a bearing body or member, as shown in Fig. 2, and irrespective of what radius the inner wall 8 of the bearing body may have after passing between the rolls 5 and 6, said rolls form the outer wall 9 of the bearing body to approximately the radius which said body will have in the finished article.

The product from the final shaping rolls shown in Fig. 9 may be a bearing body of desired length or it may be a long semi-cylindrical strip, as shown in Fig. 3, which may be sawed or otherwise divided, as at 10 to provide a plurality of bearing bodies which may be separately placed in the trimming device shown in Fig. 10 or follow one another through said trimming device. The trimming device includes a core 11, a gauge sleeve or member 12, bolts 13 or other supporting means for the core 11 and the gauge member 12, an end plate 14 to hold cutters relative to upper and lower die blocks 15 and 16 respectively of the trimming device. The die blocks cooperate with the gauge sleeve or member 12 in providing a semi-cylindrical opening or passage 17 to receive bearing bodies which are adapted to have the edges and outer wall thereof trimmed to a center line or axis of the bearing body, so that the bearing body has its edges 18 and its outer wall 9 true to form as in the finished article.

Thus far I have produced a semi-cylindrical bearing body or part that is now ready for babbitting, but before further proceeding I desire to point out that the three operations just performed to produce the bearing body may be in some instances performed by a single operation and with an apparatus or devices other than those described. Nevertheless, I believe that my method of producing the bearing body may be expeditiously and economically put into practice when a large production is necessary.

Considering the fourth and other steps of my method, I subject the inner wall 8 of the bearing body to a treatment of acid to prepare it to receive Babbitt or other soft metal and such treatment may be accomplished by a swabbing roll or wheel 19 made of felt, leather or any suitable material that will wipe the inner wall 8 of the bearing body, either by said roll being rotated by power against the wall 8 or the bearing body shifted under the roll causing it to revolve and apply acid to the wall 8. The acid may be supplied to the swabbing roll from a tank or any suitable source and the acid is adapted to prepare the wall to receive tin within a tank 20, shown in Fig. 12. The tinning tank 20 has a semi-cylindrical passage 21 which permits the swabbed bearing body to pass therethrough and receive tin on its inner wall 8 and from this tinning tank the bearing body is shifted into a semi-cylindrical passage 22 of a Babbitt tank 23 where the bearing body is provided with a Babbitt lining 24 on its inner wall 8, as shown in Fig. 4.

From the Babbitt tank 23 the babbitted bearing body is shifted into a semi-cylindrical passage 24 of a cooling or chilling device 25, said passage 24 having a cross sectional shape approximating the required thickness of the lined bearing body, and said device includes a core 26, bolts 27 or other supporting means for the core, a chamber 28 for water or any suitable cooling agent, and suitable connections 29 by which the cooling agent may be circulated in the cooling and chilling device. This cooling or chilling device is adapted to densify or set the babbitt so that it will have or present an inner hardened bearing wall of greater density than that part of the babbitt adjacent the bearing body, and in order to insure a good bond between the bearing body and the babbitt, prevent oxidization and shrinkage, and obtain as dense and close grained babbitt as possible, I arrange the tinning, babbitting and chilling devices as close together as possible and with these devices provided with suitable temperature gauges, it is possible to regulate the fifth, sixth and seventh steps of my method.

After the babbitted bearing body being chilled or hardened there may be Babbitt metal on the outer wall of the bearing body, so I may provide means for removing the Babbitt metal from the outer wall of the bearing body, then again I may provide means for trimming or reducing the outer wall of the bearing body so that it will have a radius corresponding to that of a completed article. It is apparent however, that by the first seven steps of my method I may produce a bearing for general purposes. For instance, a bearing where the outer wall of the body may be irregular so long as the inner wall thereof is of such form that a shaft or other rotary member may be journaled in it.

As pointed out in the beginning, the bearing body may be in strip form divided as shown in Fig. 3 and before such division it is possible to feed the strip through the tinning, babbitting and chilling devices and afterwards divide the strip to provide individual bearing bodies. It is in the sixth and seventh steps of my method that a bearing body may be practically completed, as in the babbitting operation suitable runners, guides and other devices may be employed for limiting the thickness of a Babbitt lining applied to the bearing body. Such lining may be a thousandth part of an inch oversize so that when cooled and chilled it will automatically set or densify to required size, and thus provide a finished article, except where it is necessary that such babbitted bearing part have oil grooves or the like. Assuming, however, that the product resulting from the seven steps or operations is somewhat unfinished I make provision for further finishing the product so that it is absolutely true in all respects to a required size of bearing parts, permitting of two such parts being placed together to form a complete annular bearing or bearing parts interchanged or placed in machines etc., without selection.

Reference will now be had to Figs. 5 and 6 showing an apparatus, which in its preferred form, includes a channel or U-shaped body 30 having an outer guide wall 31 true to form so that lined bearing bodies may be shifted thereon, end to end, and forced through the apparatus and against roughing, finishing and burnishing instrumentalities in contradistinction to such instrumentalities being driven or forced against the bearing body.

The side walls 32 of the guide body 30 have the ends thereof cut away to provide horizontally disposed shoulders or supports 33 for cross heads 34 which are bolted or otherwise secured to the walls 32, as at 35. The cross heads 34 are interchangeable and each cross head has a middle portion 36 provided with a longitudinally disposed holder 37 with the holders of said cross heads extending towards each other in substantial longitudinal alinement. Mounted on the holders 37 and retained thereon by screws 38 or other fastening means are interchangeable roughing and finishing tools 39 and 40. The roughing tool 39 is on the holder at the forward end of the apparatus and is in the form of a sleeve having its outer end provided with a roughing head 41 presenting a semi-circular cutting or trimming edge in opposed relation to the drive wall 31 and when a bearing body or part is forced between the wall 31 and the head 41 the roughing head encounters the Babbitt lining 24 of the bearing body or part and removes any rough surfaces from the surface of the babbitt. Eventually the bearing body or part reaches the finishing tool 40 at the rear end of the apparatus and this tool has a fine cutting or finishing edge or head 42 which operates upon the surface of the babbitt to finish the same true to form, at least within a ten thousandths part of an inch.

The finishing tool 40 differs from the roughing tool insomuch that said tool has annular burnishing portions 43, 44 and 45 stepped in diameter, so that the annular portion 43 may initially burnish the surface of the babbitt, the annular portion 44 further burnish the babbitt surface, and the annular portion 45 finish such burnishing. With each annular portion performing a fractional part of the burnishing or broaching to be done it is possible to gradually reduce or finish the surface of a babbitt so that as each bearing body or part is ejected from the apparatus it is true to form and a perfect article. In case such article is to have oil grooves or the like the operation of providing such oil grooves form before the bearing body or part enters the apparatus. In this apparatus there has been performed three operations or steps of my method, namely, rough finishing, fine finishing, and burnishing or broaching and with the roughing and finishing tools 39 and 40 of proper size and accurately set in the apparatus there is no guesswork whatsoever as to the ultimate size of the article delivered by the apparatus.

What I claim is:—

1. In the art of producing bearings, bushings, and the like, a method for the production of lined half bearings which method consists of shaping a flat piece of stock to provide a semi-cylindrical bearing body, trimming the edges of the bearing body relative to a center line thereof, cleaning the inner wall of the bearing body, and then tinning and applying the lining material to the inner wall of the bearing body.

2. The method called for in claim 1, and an additional step of chilling the lined bearing body to densify the lining material.

3. In the art of producing bearings, bushing etc., a method of producing such article which consists in providing a semi-cylindrical bearing body with a lining and immediately chilling the bearing to densify the lining thereof, said bearing body being of sufficient length to permit of the bearing body being severed to provide a plurality of individual bearing bodies.

4. A method for the production of lined half bearings which method consists in producing semi-cylindrical lined bearing bodies having the outer walls corresponding to that of the complete article and an inner lining wall of less radius than the inner wall of the complete article, and then place the bearing body in a horizontal position with its lining uppermost and forcing the lined bearing body under and against the finishing instrumentality to remove a portion of the lining to increase the radius of the inner wall of the lined bearing body to correspond to that of a complete article.

5. A method for finishing half lined bearings wherein said bearings have outer walls corresponding to that of finished bearings, which method consists in forcing the half lined bearings, end to end, through a guide having a wall which maintains the shape of the outer walls of such bearings, said guide having an inner wall engaging the lined walls of the bearings and reducing and finishing such walls to correspond to the finished inner walls to complete half bearings.

In testimony whereof I affix my signature in presence of two witnesses.

WALTER A. KING.

Witnesses:
E. W. DAVIES,
KARL H. BUTLER